UNITED STATES PATENT OFFICE.

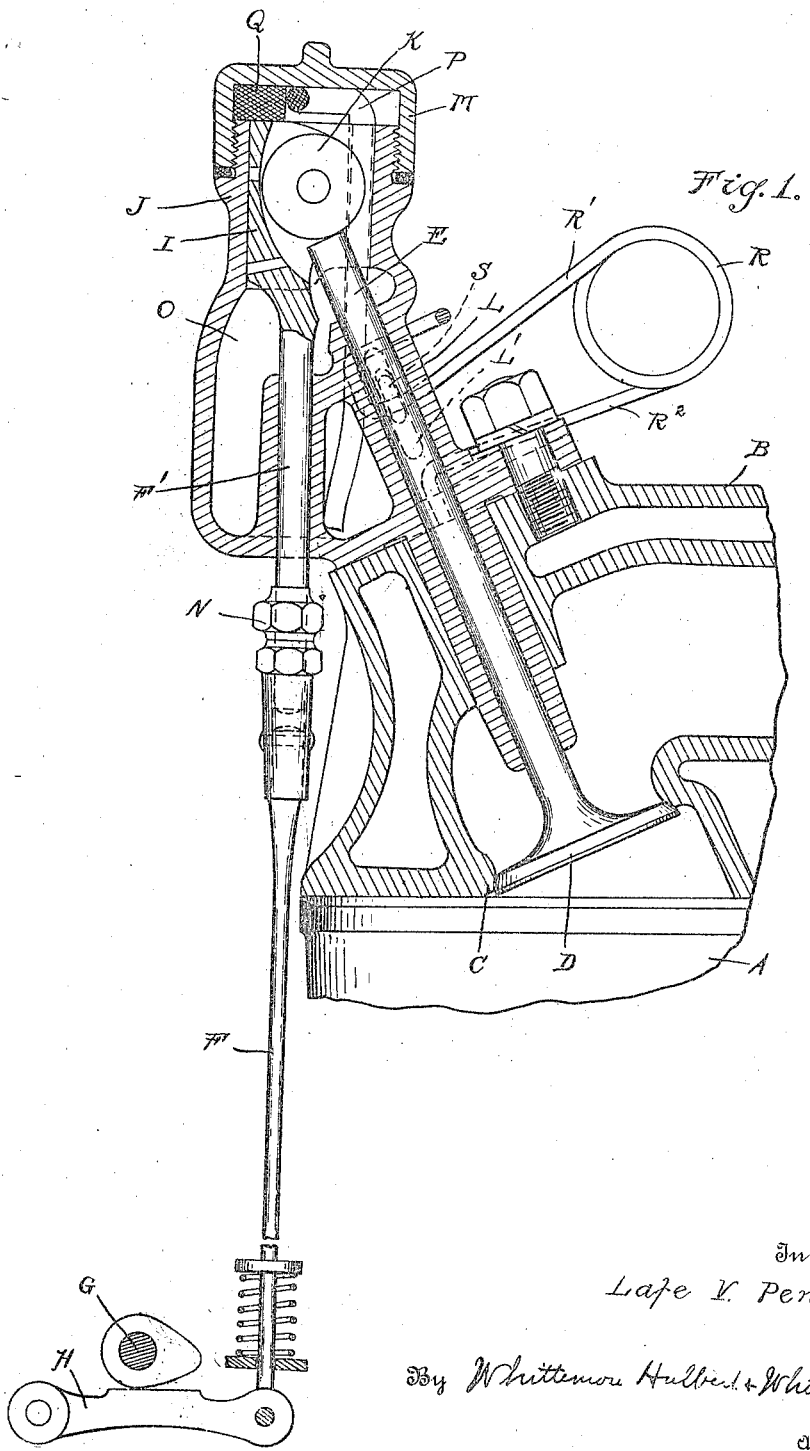

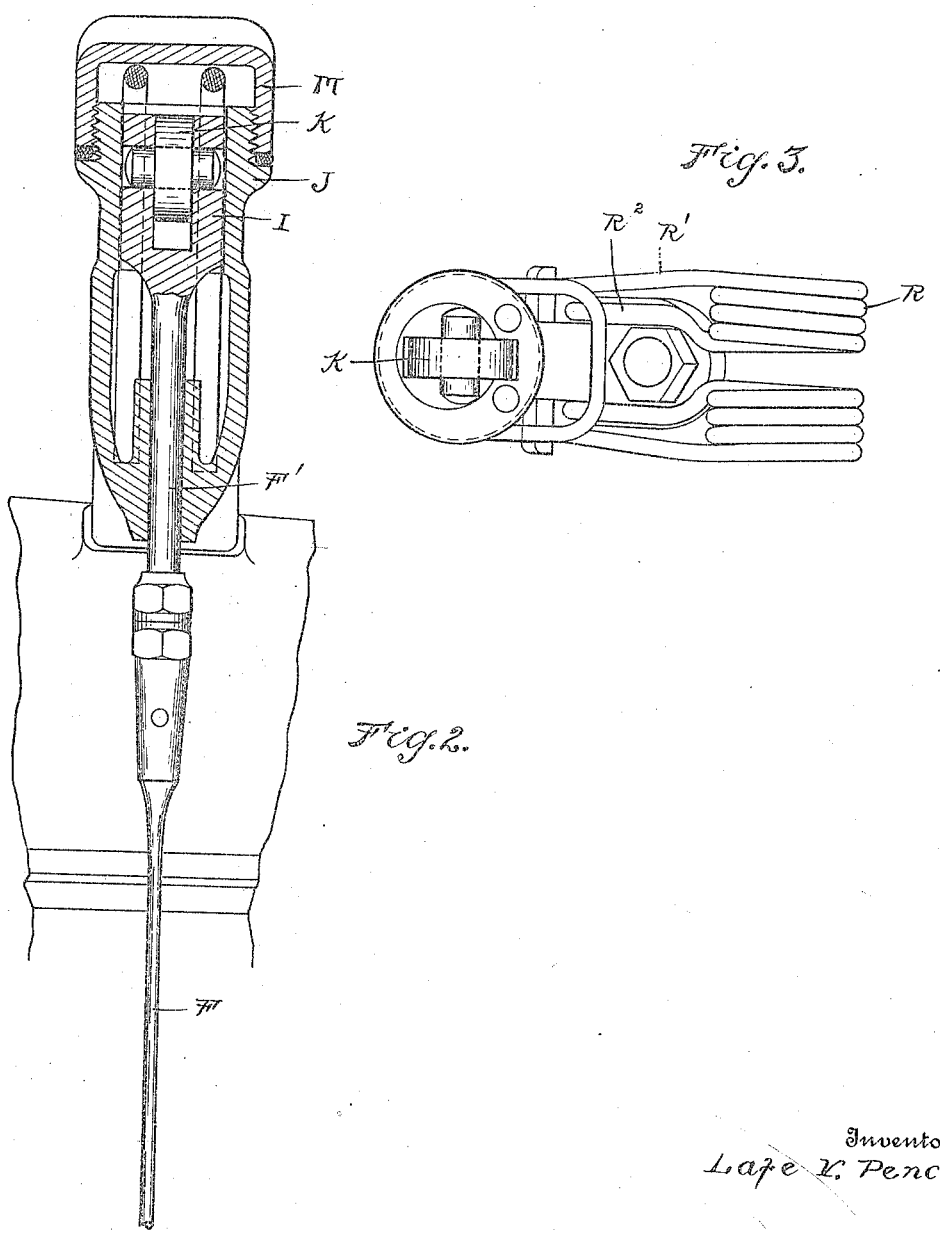

LAFE V. PENCE, OF FLINT, MICHIGAN, ASSIGNOR TO GENERAL MOTORS CORPORATION, OF DETROIT, MICHIGAN, A CORPORATION OF DELAWARE.

VALVE-OPERATING MECHANISM.

1,267,899.

Specification of Letters Patent. Patented May 28, 1918.

Application filed August 27, 1917. Serial No. 188,331.

*To all whom it may concern:*

Be it known that I, LAFE V. PENCE, a citizen of the United States of America, residing at Flint, in the county of Genesee and State of Michigan, have invented certain new and useful Improvements in Valve-Operating Mechanism, of which the following is a specification, reference being had therein to the accompanying drawings.

The invention relates to valve-operating mechanism particularly designed for use in connection with the valve-in-the-head type of motor, and it is the object of the invention to reduce wear and noise by cutting down on the number of joints in the mechanism. The invention therefore comprises the novel construction as hereinafter set forth.

In the drawings:

Figure 1 is a vertical section through an engine to which my valve-operating mechanism is applied;

Fig. 2 is a vertical section at right angles to Fig. 1;

Fig. 3 is a sectional plan view.

A is the engine cylinder and B the head which is provided with suitable seats C for puppet valves D. Instead of arranging these valves in the usual manner with their stems parallel to the axis of the cylinder they are arranged, as shown, at an angle, so that the upper end of a stem E passes out from the head adjacent to one side of the engine cylinder. F is the valve-actuating rod, which at its lower end extends into the crank case and is operated by the cam G through the medium of a rocker lever H or other suitable connection. The upper end of the rod F extends to the point of intersection with the axis of the stem E and is provided with an enlarged head I slidably engaging a casing or guide J. Within the enlarged head I is a roller K, the periphery of which contacts with the upper end of the stem E so that the downward movement of the rod F will actuate said stem.

As specifically shown, the casing J is formed integral with the guide L for the valve-stem and is provided with a removable cap M permitting access thereto. The head I is also formed integral with a section F' of the rod F, which is coupled to the lower section thereof by suitable means, such as the coupling N. The casing J is preferably formed with a chamber O in its lower portion which is filled with lubricant, a wick P extending upward therefrom into contact with a pad Q beneath the cap M. This pad is arranged to contact with the upper end of the head I when the rod F is raised, and in this way lubricant is squeezed from the pad on to the roller bearing K and guide bearing for the head.

With the construction as described, the rocker lever upon the engine head is dispensed with and the stem of the valve is directly connected with the actuating rod. This eliminates several joints in the connection, reducing the back-lash and consequently the wear and noise incident thereto. The lever H and cam G are inclosed in the crank case where lubrication is easily maintained, and the fact that these parts are inclosed prevents noise therefrom.

The arrangement of the valve-stem will interfere with the sleeving thereon of the usual spiral spring for seating the valve. I therefor preferably employ a different type of spring, which as shown comprises a coil spring R arranged at one side of the stem and having arms R' and R$^2$ extending laterally therefrom. One of these arms is anchored in the casing member L while the other arm engages a cross-pin S secured to the stem E and passing outward through a slot L' in said casing. The tension of the coil operates to move the arm R upward and this, acting through the pin S, will hold the valve to its seat.

What I claim as my invention is:

1. In a valve-operating mechanism, the combination with a valve and its stem, of an actuating rod extending at an angle to the axis of the stem, a common guide member for the actuating rod and stem, a spring acting upon the stem to seat the valve, and a roller carried by the actuating member within said guide member bearing upon the end of the stem.

2. In a valve-operating mechanism, the combination with a valve and its stem, of an actuating rod extending at an angle to the axis of the stem, a common guide member for the actuating rod and stem, an arm laterally projecting from the stem, a spring engaged between the guide member and said arm to seat the valve, and a connection between said stem and rod within the guide member for unseating the valve.

3. In a valve-operating mechanism, the combination with a valve and its stem, of an actuating rod extending at an angle to the axis of the stem, a common guide member for the stem and actuating member formed with slots respectively at opposite sides of the stem, arms carried by the stem projecting through said slots, springs engaged between said arms and the guide member for seating the valve, and a connection within the guide member between the actuating rod and stem for unseating the valve.

4. In a valve-operating mechanism, the combination with a valve and its stem, of an actuating rod extending at an angle to the axis of the stem, a guide member for the stem formed with a lubricating chamber in its lower portion, a pad in the upper portion of the guide member, means for supplying lubricant to said pad, a head carried by the actuating rod engageable with said pad in the raised position of the rod to force a discharge of lubricant therefrom, and a roller carried by said head engageable with said stem to unseat the valve through movement of the actuating rod.

5. In a valve-operating mechanism, the combination with a valve and its stem, of an actuating rod extending at an angle to the axis of the stem, a common guide member for the actuating rod and stem, a connection within said guide member for communicating movement from the rod to the stem, and positive lubricating means for the rod and stem within said guide member actuable by one of the lubricated members.

6. In a valve-operating mechanism, the combination with a valve and its stem, of an actuating rod extending at an angle to the axis of the stem, a guide member for the stem formed with a lubricating chamber in its lower portion, a connection within said guide member for communicating movement from the rod to the stem, a pad in the upper portion of the guide member, and means for supplying lubricant to said pad from said chamber, said pad being periodically engaged by one of said actuating and actuated members to force a discharge of lubricant therefrom.

7. In a valve-operating mechanism, the combination with a valve and its stem, of an actuating rod extending at an angle to the axis of the stem, a guide member for the actuating rod and stem, a connection within said guide member for communicating movement from the rod to the stem, means for conducting a lubricant from the lower to the upper portion of said guide member, and means in the upper portion of the guide member engageable by one of the actuating and actuated members to produce a periodic discharge of lubricant.

In testimony whereof I affix my signature.

LAFE V. PENCE.